(12) United States Patent
Currey (10) Patent No.: US 11,325,156 B2
(45) Date of Patent: *May 10, 2022

(54) HYDRAULIC MOTOR

(71) Applicant: Albert Ben Currey, Phoenix, AZ (US)

(72) Inventor: Albert Ben Currey, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/399,929

(22) Filed: Aug. 11, 2021

(65) Prior Publication Data

US 2021/0370349 A1    Dec. 2, 2021

Related U.S. Application Data (63) Continuation-in-part of application No. 17/207,061, filed on Mar. 19, 2021, which is a continuation-in-part of application No. 16/802,851, filed on Feb. 27, 2020, now Pat. No. 10,987,698, which is a continuation of application No. 16/553,088, filed on Aug. 27, 2019, now Pat. No. 10,610,896.

(51) Int. Cl.
*B06B 1/18* (2006.01)

(52) U.S. Cl.
CPC .................................... *B06B 1/186* (2013.01)

(58) Field of Classification Search
CPC ....................................................... B06B 1/186
USPC ................................................. 366/124–126
See application file for complete search history.

(56) References Cited

U.S. PATENT DOCUMENTS

| | | | |
|---|---|---|---|
| 2,970,570 A | | 2/1961 | Hill |
| 3,866,480 A | * | 2/1975 | Elliston .................. B06B 1/167 74/87 |
| 4,472,980 A | | 9/1984 | Wadensten |
| 4,590,814 A | | 5/1986 | Wadensten |
| 5,314,305 A | * | 5/1994 | Fink ........................ B06B 1/186 366/124 |
| 6,244,815 B1 | * | 6/2001 | Treat ...................... B06B 1/186 366/124 |
| 6,261,059 B1 | * | 7/2001 | Wadensten ............. B06B 1/186 415/198.1 |
| 2001/0004438 A1 | | 6/2001 | Reis |
| 2018/0292501 A1 | * | 10/2018 | Neumann .............. G01R 33/30 |

* cited by examiner

*Primary Examiner* — Justin D Seabe
(74) *Attorney, Agent, or Firm* — Schmeiser, Olsen & Watts, LLP (57) ABSTRACT

A hydraulic motor is provided. The device includes a manifold member having an inner volume, a fluid inlet orifice and a fluid outlet orifice. The device further includes a power generating member having a channel grooved drive. The inner volume receives the power generating member within the inner volume and retains the power generating member within the inner volume. The power generating member rotates and generates power to be supplied to an external device in response to hydraulic fluid flowing into the manifold member through the inlet orifice and out of the manifold member through the outlet orifice.

6 Claims, 11 Drawing Sheets

HYDRAULIC MOTOR

CROSS REFERENCE TO RELATED APPLICATION[S]

This application is a continuation-in-part of the earlier U.S. Utility patent application Ser. No. 17/207,061, filed Mar. 19, 2021, now pending, which is a continuation-in-part of the earlier U.S. Utility patent application Ser. No. 16/802,851, filed Feb. 27, 2020, now U.S. Pat. No. 10,987,698, which is a continuation of the earlier U.S. Utility patent application Ser. No. 16/553,088, filed Aug. 27, 2019, now U.S. Pat. No. 10,610,896, the disclosures of which are hereby incorporated entirely herein by reference.

BACKGROUND OF THE INVENTION

Technical Field

This invention relates generally to a hydraulic motor, and more particularly to a hydraulic driven motor operating under high pressure hydraulics within a pressure range of 0-6000 psi, which is not available today.

State of the Art

There are several material processing products as well as other types of products that utilize motors. These motors are generally electromechanical systems that operate by drawing power from a power source to drive an external component. There are limitations, including limitations on the access to or supply of power from power sources and components that are prone to failure.

Therefore, there is a need for an improved motor that is not electromechanical or mechanical and has greater durability than conventional motors.

SUMMARY OF THE INVENTION

An embodiment includes a hydraulic motor comprising: a manifold member comprising an inner volume, a fluid inlet orifice and a fluid outlet orifice; and a power generating member operatively coupled within the manifold member, power generating member comprising a channeled grooved drive, wherein: the power generating member comprising a spool and a drive shaft; and the channeled grooved drive comprises: a channel formed in the outer surface of the spool of the power generating member; a plurality of recessed grooves formed within the channel formed in the outer surface of the spool and around a circumference of the spool, wherein the plurality of recessed grooves are evenly spaced around the circumference of the spool and each recessed groove comprises a fluid engaging surface, wherein the power generating member rotates in response to hydraulic oil flowing into the inner volume of the manifold member through the inlet orifice, wherein the hydraulic oil engages the plurality of recessed grooves to rotate the power generating member, and the hydraulic oil flows out of the inner volume of the manifold member through the outlet orifice.

Another embodiment includes a method of operating a hydraulic motor comprising: directing flow of hydraulic oil into a manifold member with a power generating member coupled within the manifold member, wherein the power generating member comprises a channeled groove drive comprising a channel and a plurality of recessed grooves; rotating the power generating member rotates in response to the hydraulic oil directed into the inner volume of the manifold member engaging one or more recessed grooves of the plurality of recessed grooves; and directing flow of hydraulic oil out of the manifold member.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a hydraulic driven motor.

Referring to the drawings, FIGS. 1-4B depict an embodiment of a hydraulic driven motor 10. The motor 10 generally comprises a manifold member 12 and a power generating member 30, wherein the power generating member 30 is retained within the manifold member 12. In some embodiments, the motor 10 may include retaining plates 20, wherein the bearing plates retain the power generating member 30 within the manifold member 12 by coupling the retaining plates 20 to the manifold member 12.

Figure 1:
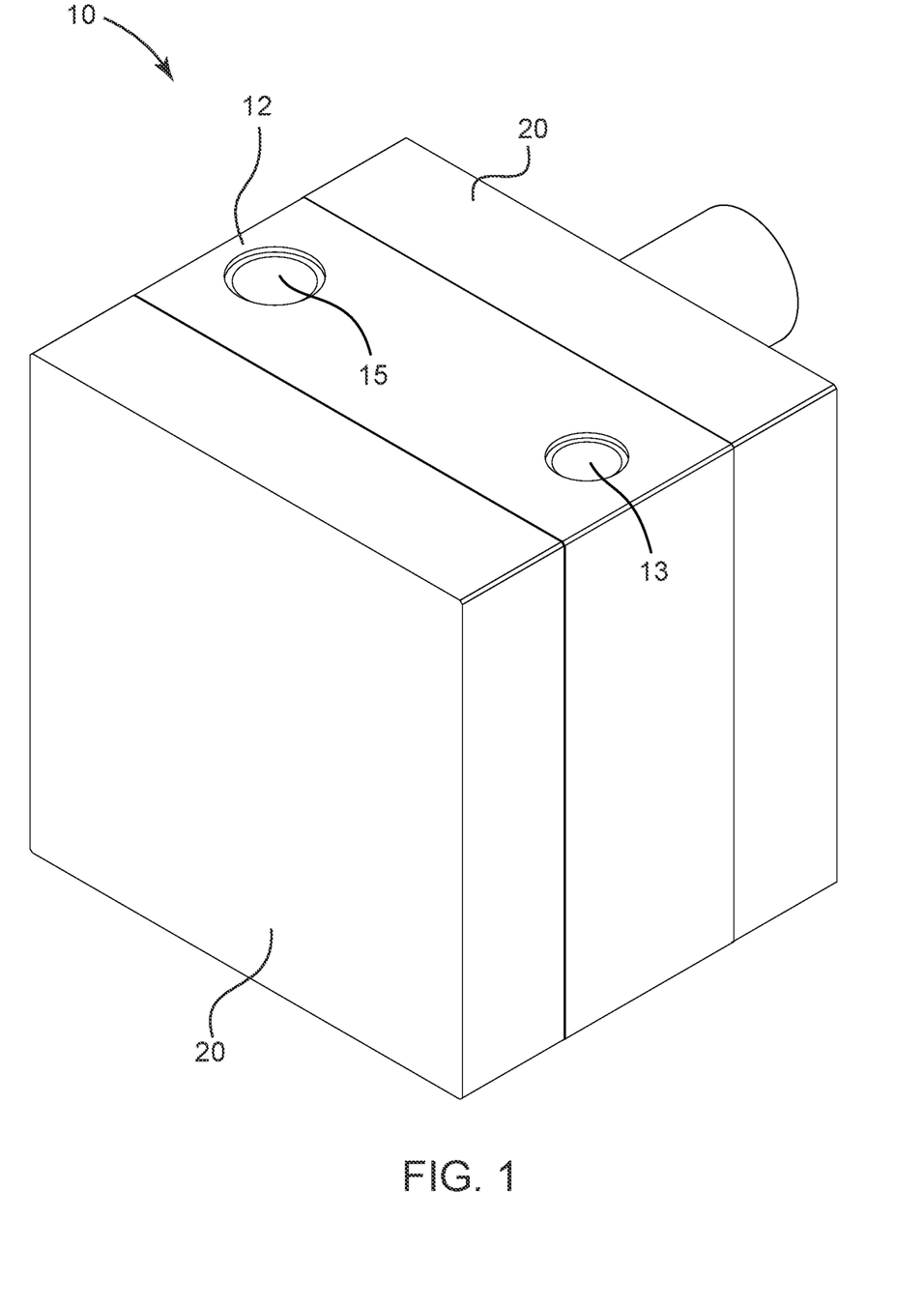
FIG. 1 is a perspective view of a hydraulic motor according to an embodiment.
Figure 2A:
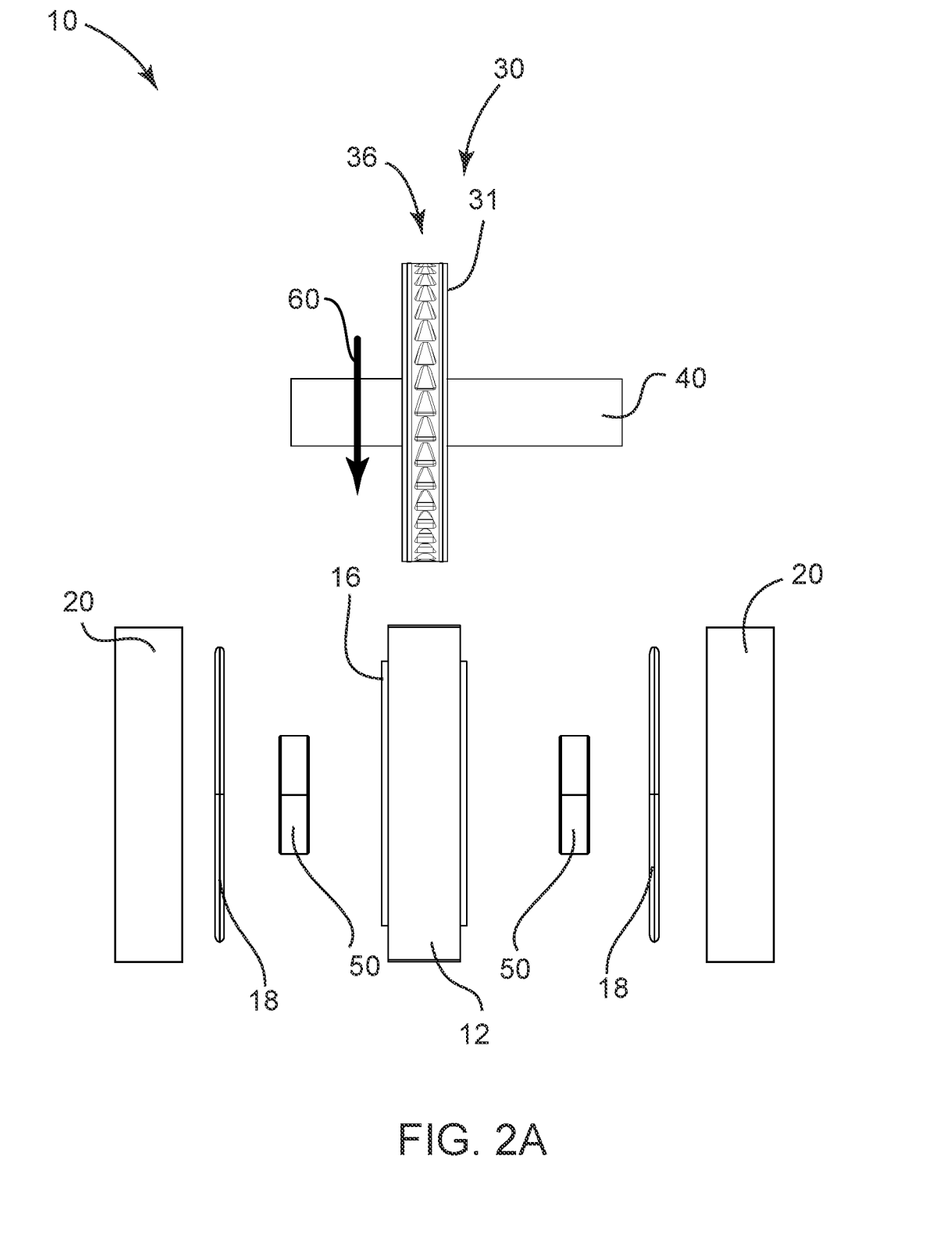
FIG. 2A is an exploded view of a hydraulic motor according to an embodiment.
Figure 2B:
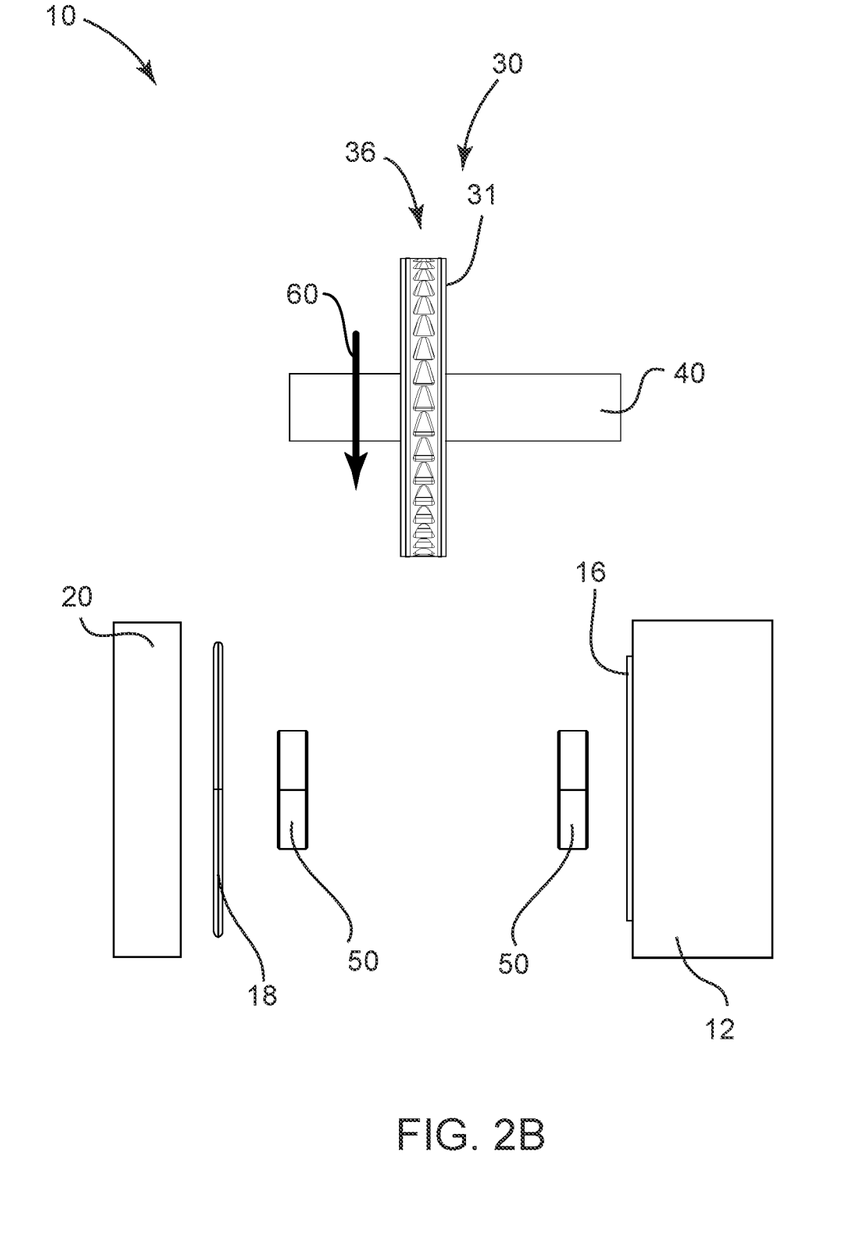
FIG. 2B is another exploded view of a hydraulic motor according to an embodiment.

The manifold member 12 may be a block shape or other shape that is needed for the operation of the hydraulic motor 10. The manifold member 12 may comprise an inner volume 14 that may be an aperture extending through the manifold member 12, wherein the aperture 14 may be bounded on each end by coupling the retaining plates 20 on opposing side of the manifold member 12. In embodiments, the inner volume 14 is a cylindrical shape. The manifold member 12 may also comprise an inlet orifice 13 and an outlet orifice 15. This allows hydraulic fluid to flow into the manifold member 12 through the inlet orifice 13 and into the inner volume 14 to engage and rotate the power generating member 30, and then out through the outlet orifice 15. The outlet orifice 15 has a larger opening to the inner volume 14 than the inlet orifice 13 in order to remove fluid from the inner volume as quickly as possible. An inlet hose adapter (not shown) may be coupled between the inlet orifice 13 and an inlet hose and an outlet hose adapter (not shown) may be coupled between the outlet orifice 15 and an outlet hose, thereby allowing a fluid inlet hose and a fluid outlet hose to be coupled to the manifold member 12 for operation of the device 10. The inlet orifice 13 and the outlet orifice 15 may be at any angle through the manifold member 12 to accomplish the flow of hydraulic fluid into and out of the manifold member 12. As will be understood hydraulic fluid may comprise, but is not limited to, gas, air, oil, water and the like fluids that can be flowed through the system and operate the vibration generating device 10.

In further embodiments, the inlet orifice 13 may comprise a reduce diameter portion 17 extends between the inlet orifice 13 the inner volume 14 of the manifold member 12. This reduction of diameter may operate to increase the pressure of the hydraulic fluid engaging the power generating member 30.

The manifold member 12 may comprise a protrusion 16 extending from each side and adjacent to the aperture forming a portion of the inner volume 14. The protrusion 16 may operate to extend within a recess 40 of the retaining plate 20 when the retaining plate 20 is coupled to the manifold member 12.

The manifold member 12 may have various apertures and recesses that are utilized to couple the retaining plate 20 to the manifold member and for use of couplers to couple the manifold member 12 to an external device to vibrate. While these apertures and recesses are shown, they are only for exemplary purposes and should not be considered a limitation, but simply as one way that certain components of a hydraulic motor 10 may be coupled together. Other forms of coupling components together are contemplated and may be used with departing from the scope of the invention and claims. Further, the manifold member 12 is depicted as a unitary body member. It will be understood that the manifold member 12 may comprise at least two portions that may be coupled together to form the manifold member 12.

Figure 3A:
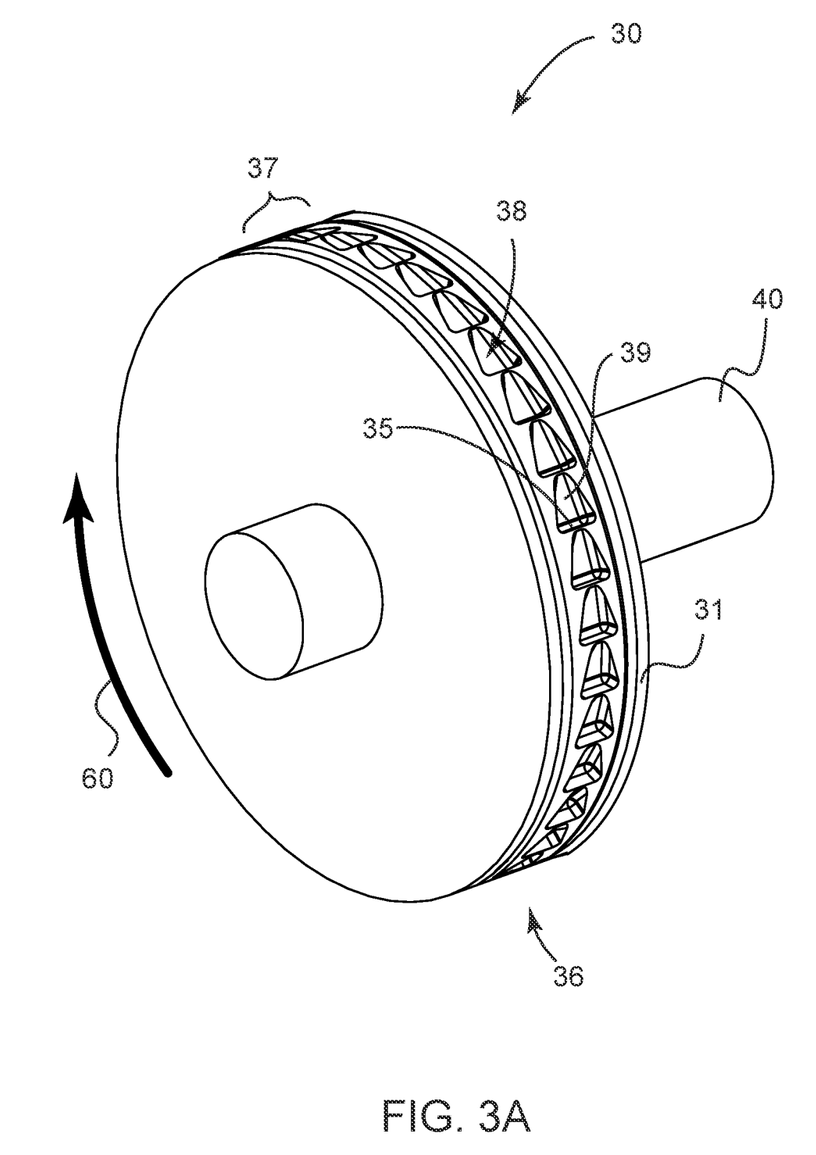
FIG. 3A is a perspective view of a hydraulic power generating device according to an embodiment.
Figure 3B:
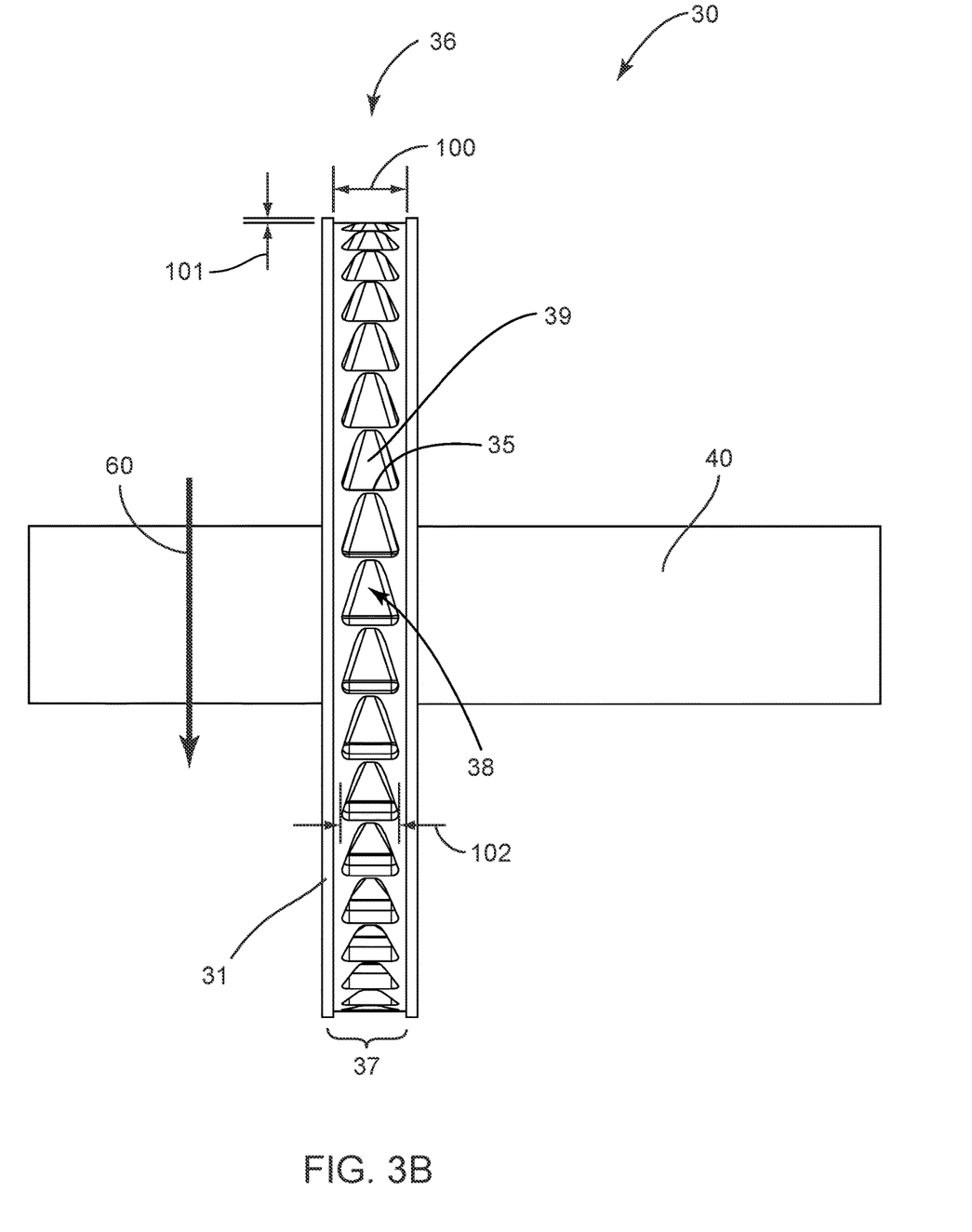
FIG. 3B is an end view of a hydraulic power generating device according to an embodiment.
Figure 3C:
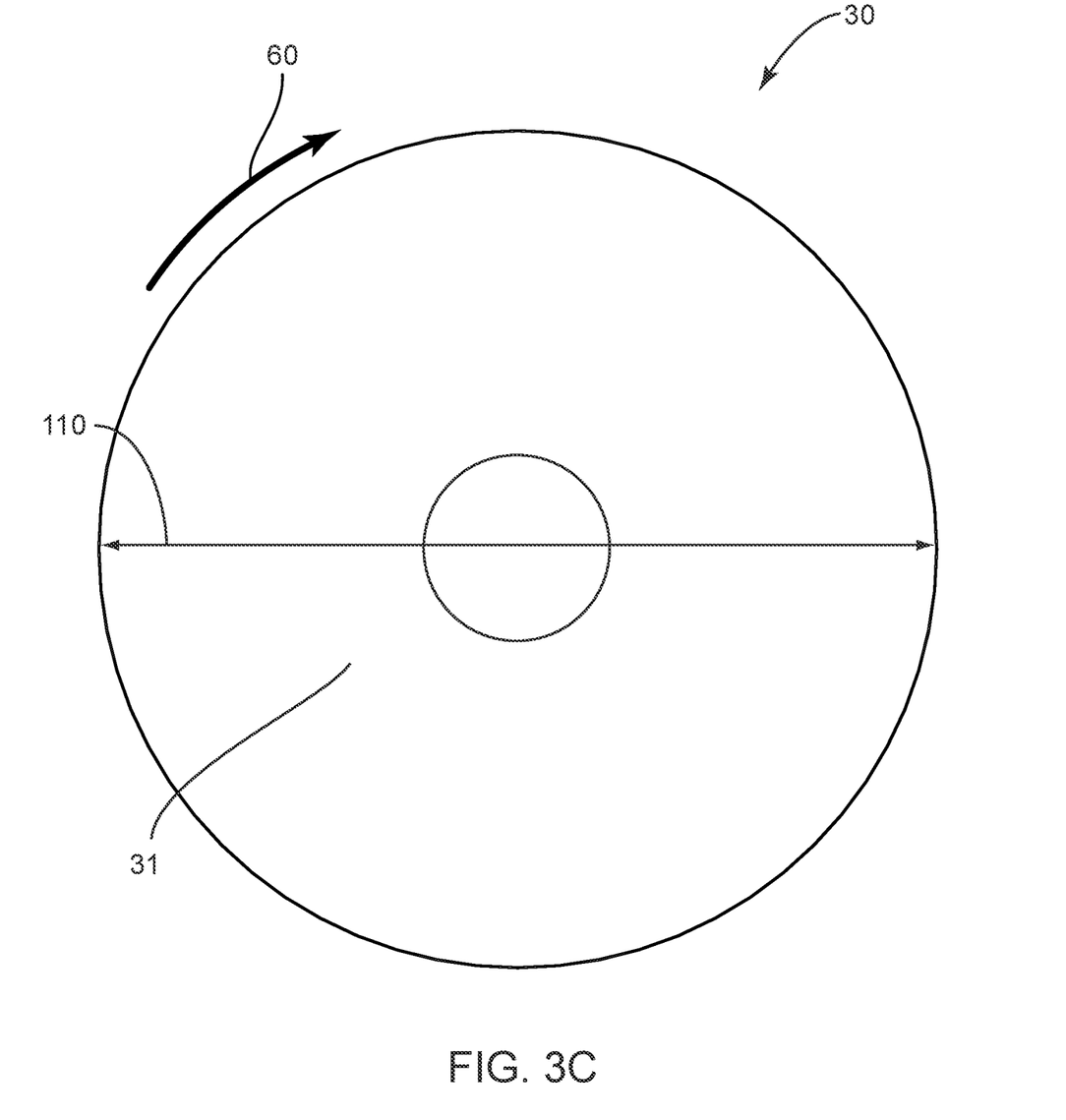
FIG. 3C is a side view of a hydraulic power generating device according to an embodiment.

Referring to FIG. 3A-3C, an embodiment may include power generating member 30 may comprise a spool 31. The spool 31 of the power generating member 30 is rotatable within the inner volume 14 of the manifold member 12. The rotation of the spool 31 results in generation of power directed to a drive shaft 40 extending from the manifold member 12.

The power generating member 30 comprises a channeled grooved drive 36 formed in the outer surface of the spool 31 around a circumference of the spool 31. The channeled grooved drive 36 comprises a channel 37 formed in the outer surface of the spool 31 of the power generating member 30 and a plurality of recessed grooves 38 formed within the channel 37 and in the outer surface of the spool 31 around a circumference of the spool 31. The plurality of grooves 38 are evenly spaced around the circumference of the spool 31, such that hydraulic fluid may engage the grooves 38 to rotate the spool 31. The grooves 38 are shown as recesses formed in the spool 31 having fluid engaging surfaces 36 operating to rotate the power generating member 30 as fluid flowing from the inlet orifice 13 of the manifold member 12 applies force to the fluid engaging surface 35 causing a partial rotation and extends an adjacent fluid engaging surface 35 within the stream of hydraulic fluid entering through inlet orifice 13 to continuously rotate the shaft during flow of hydraulic fluid into the manifold member 12. The grooves 38 may comprise slots, notches or may further comprise tapered surfaces 39 that operate for allowing the fluid stream to engage the fluid engaging surface 35 for a longer period of time or through a longer arc to more efficiently rotate the spool 31 as will be described in greater detail with respect to FIGS. 4A and 4B.

Figure 4A:
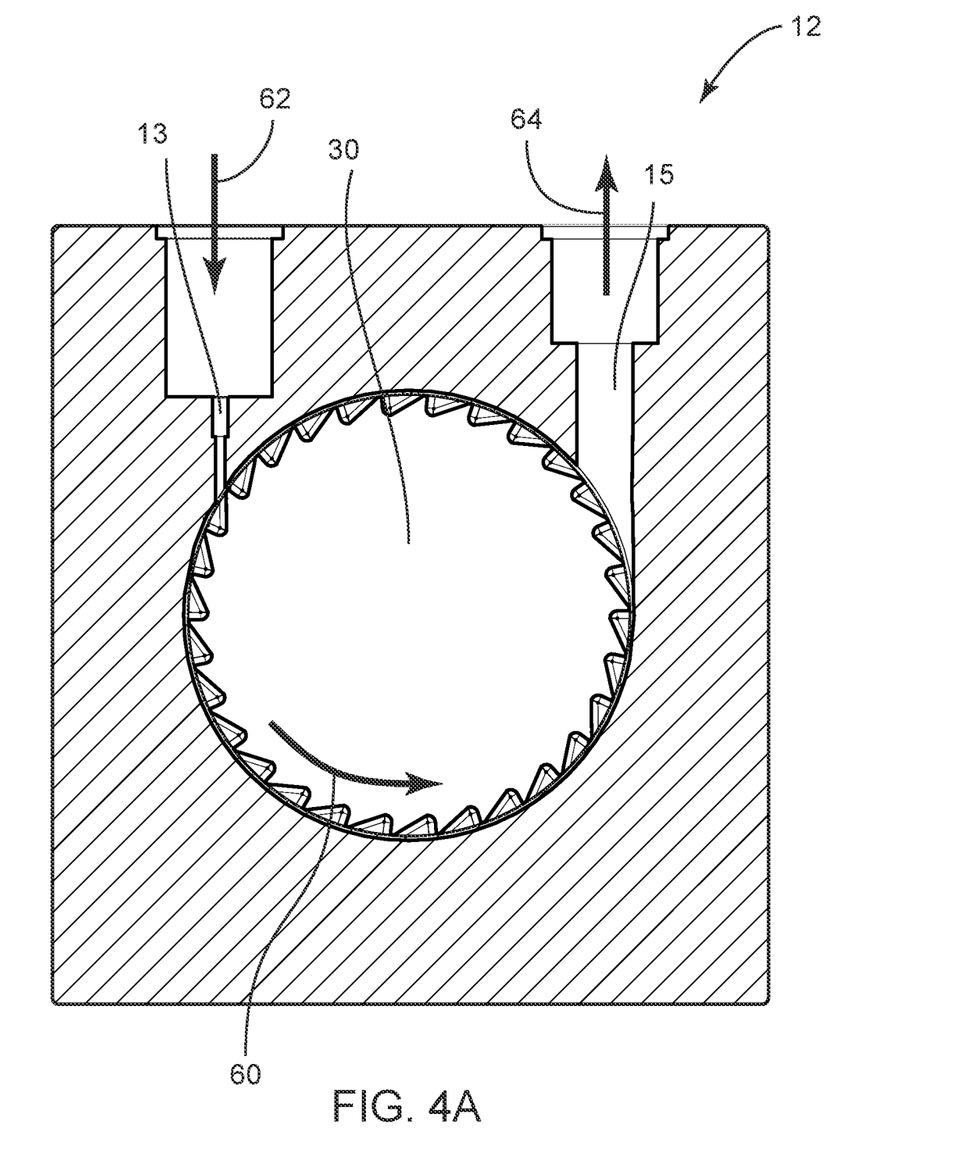
FIG. 4A is side section view of a manifold member with a hydraulic power generating device according to an embodiment.
Figure 4B:
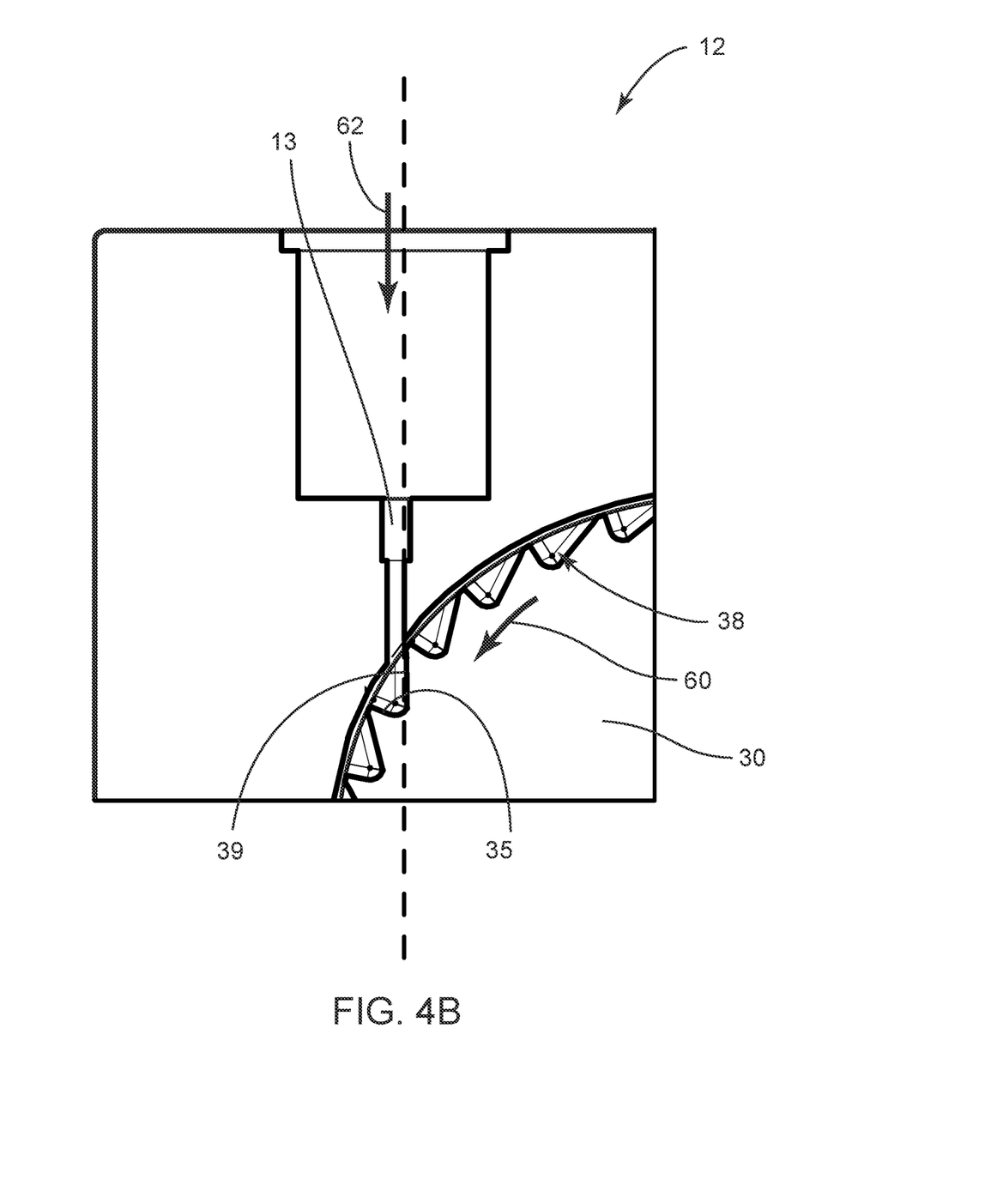
FIG. 4B is a close-up partial view of a manifold member with a hydraulic power generating device according to an embodiment.

As shown in FIGS. 4A and 4B, the plurality of grooves 38 operate to rotate the power generating member 30 as fluid flowing from the inlet orifice 13 of the manifold member 12, the fluid applies force to the fluid engaging surfaces 35 causing a partial rotation and extends an adjacent fluid engaging surface 35 within the stream of hydraulic fluid entering through the first or second inlet orifice 13 to continuously rotate the spool 31 during flow of hydraulic fluid into the manifold member 12. The shape of the grooves 38 operate to allow the fluid stream to engage the fluid engaging surface 36 for a longer period of time or through a longer arc to more efficiently rotate the spool 31 depending on the speed of rotation or torque desired. To further assist in increasing the amount of the fluid engaging surface 35 that the fluid stream engages, the inlet orifice 13 may have an edge aligned with the tapered surface 39 of each groove 38 for a moment as each groove 38 rotates past the inlet orifice 38, thereby allowing the fluid stream to contact the fluid engaging surface 36 from one edge of the surface 36 on the outer diameter of the spool 31 to the other edge of the surface 36 within the spool 31 as the spool 31 rotates within the manifold 12. The fluid engaging surface 36 may extend radially into the spool 31 and the tapered surface 39 may extend from an end of the fluid engaging surface 36 within the spool 31 to the outer surface of the spool 31.

The grooves 38 are depicted in the drawings as having a triangular shape. It will be understood that other shapes may be utilized, such as a rectangular shape, a rectilinear shape and so forth. Additionally, the size of the spool 31 may vary depending on the needed use of the motor 10. Along with the size of the spool 31, the manifold 12 will change in size to accommodate the size of the spool 31. Further still the spool 31 may comprise any number of grooves 38, the number of grooves 38 selected for the various uses needed. In addition to the number of grooves 38, the width and depth of the grooves may vary along with the width and depth of the channel 37

Further, as shown in FIG. 4B, in some embodiments, the spool 31 may include a protrusion surfaces or channel walls 33 that extends from the outer surface of the spool 31 around a circumference of the spool 31. The channel grooved drive 36 would then be formed in channel walls 33, as shown in FIG. 3B. The raised channel walls 33 allows the spool 31 to rotate with less friction. In other embodiments, the channel 37 is formed within the spool 31 and the channel walls 33 are simply the outer edges of the spool 31 that the channel 37 is formed within.

The hydraulic motor 10 is capable of operating in low to high pressures and operate the motor 10 in slow to high speeds. The size of the channel grooved drive 36 functions to determine the amount of pressure and the volume and rate of hydraulic fluid that is needed to flow into hydraulic motor 10 in order to rotate the power generation member 30. In other words, the depth of the channel 37 and the depth of the grooves 38 can be adjusted for the amount of fluid flow to thereby govern the amount of flow of a desired gallon per minute rate. Additionally, the inlet orifice 13 can be adjusted in size to adjust the amount of fluid flow. Typically, the larger the spool 31, the more fluid flow is needed for operation. The larger spool 31 is typically used when more mass is needed and can be accomplished by increasing the diameter of the spool 31 or may increasing the length of the spool 31. Further still, the power generation member 30 may comprise varying numbers, shapes and sizes of plurality of recessed grooves 38 of the channel grooved drive 36. For example, the size and number of the grooves, width of the grooves, and shape of the grooves operate to control or adjust the revolutions per minute and torque of the power generation member 30.

Additionally, in some embodiments, as shown in FIGS. 3A-3C depict a spool 31 that is slightly larger than the channel grooved drive 36, other sizes may be utilized. The smaller length spool 31 operates to reduce drag and friction during operation of the hydraulic motor.

Figure 4C:
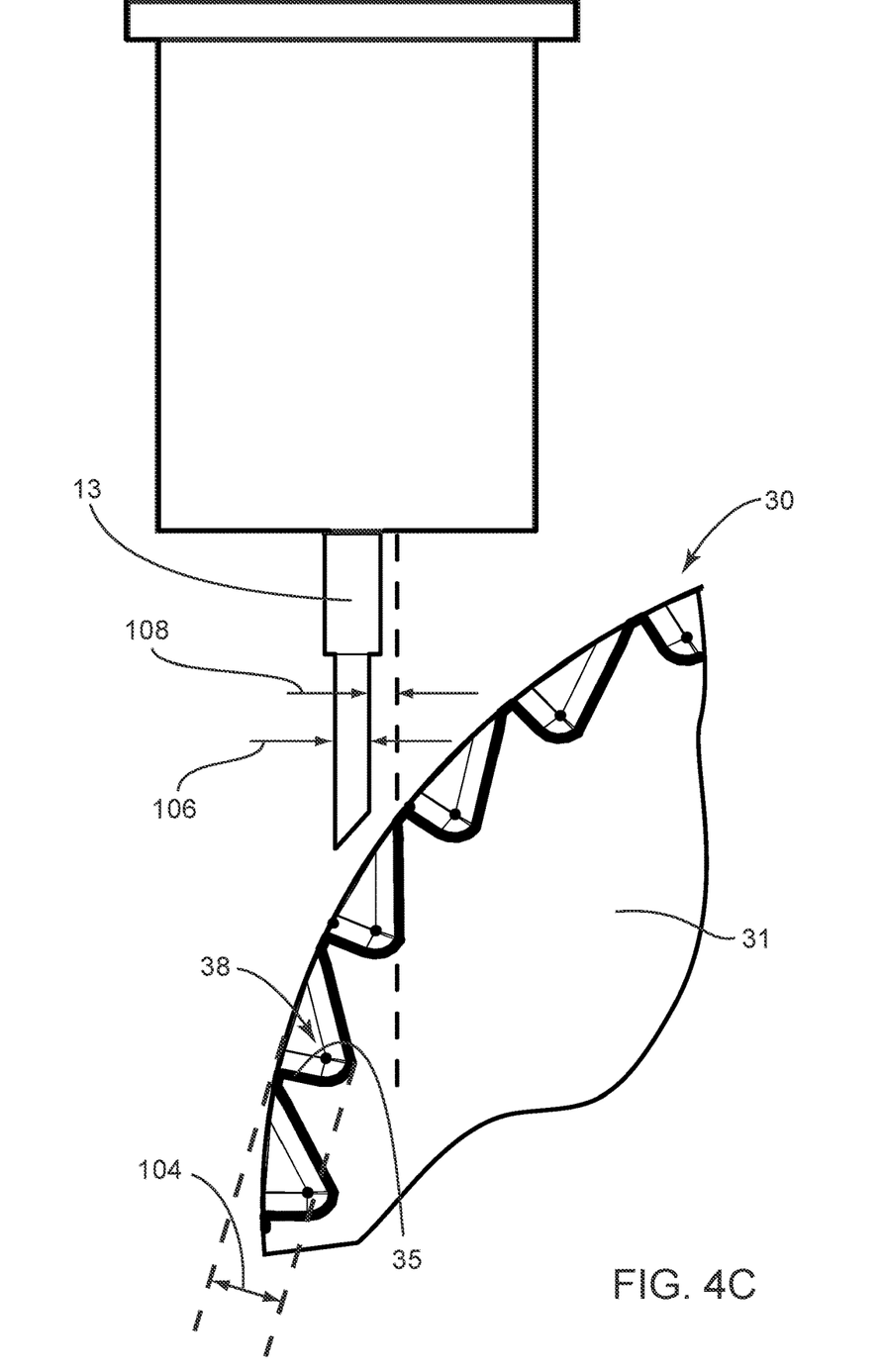
FIG. 4C is a close-up partial view of a hydraulic power generating device and input orifice according to an embodiment.

Referring additionally to FIGS. 3B and 4C, torque and speed of rotation of the power generating device 30 may be controlled or selected through controlling size, shape and/or location of certain components of the hydraulic motor 10. In embodiments of the power generating device 30, the dimensions of the channel 37 may be selected depending on the torque and speed of rotation desired. In embodiments, the width 100 and the depth 101 of the channel 37 may be selected depending on the desired torque and speed of rotation of the power generating device 30. Further, a location of the inlet orifice 13 with respect to the fluid engaging surface 35 is selected depending on desired torque and speed of rotation the power generating device 30. In embodiments, the location 108 away from an edge of the fluid engaging surface 35 within the spool 31 of the power generating device 30 may be selected depending on desired torque and speed of rotation the power generating device 30. In embodiments, the 104 depth and width 102 of each recessed groove 38 may selected depending on desired torque and speed of rotation the power generating device 30. Additionally, in embodiments, a size 106, such as a diameter, of the inlet orifice 13 is selected depending on desired torque and speed of rotation the power generating device 30. Yet further still, a diameter 110 of the spool 31 of the power generating device 30 is selected depending on desired torque and speed of rotation the power generating device 30. In embodiments, one or more of the above may be selected depending on the desired torque and speed of rotation the power generating device 30.

Figure 5A:
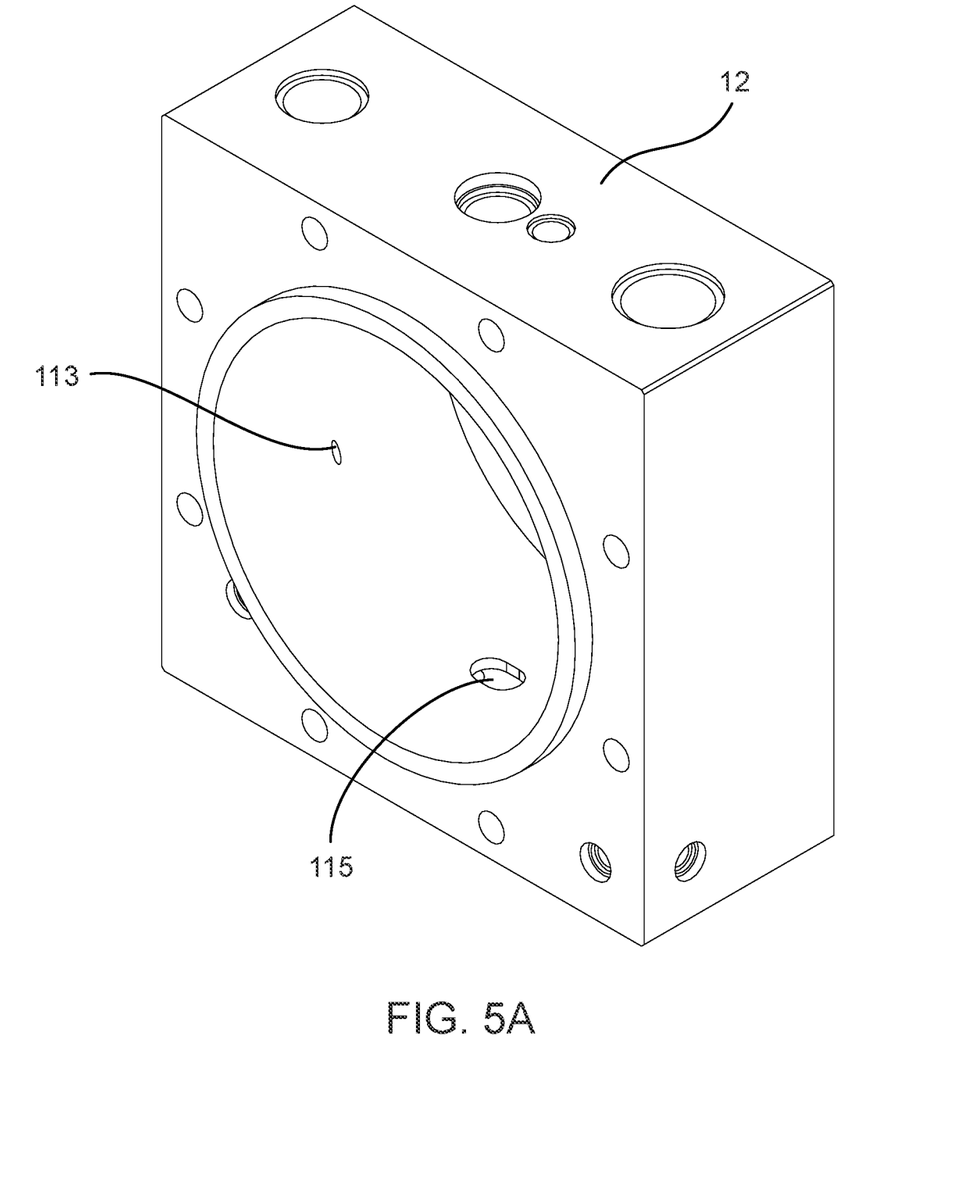
FIG. 5A is a perspective view of a manifold member with dual inlets and dual outlets according to an embodiment.
Figure 5B:
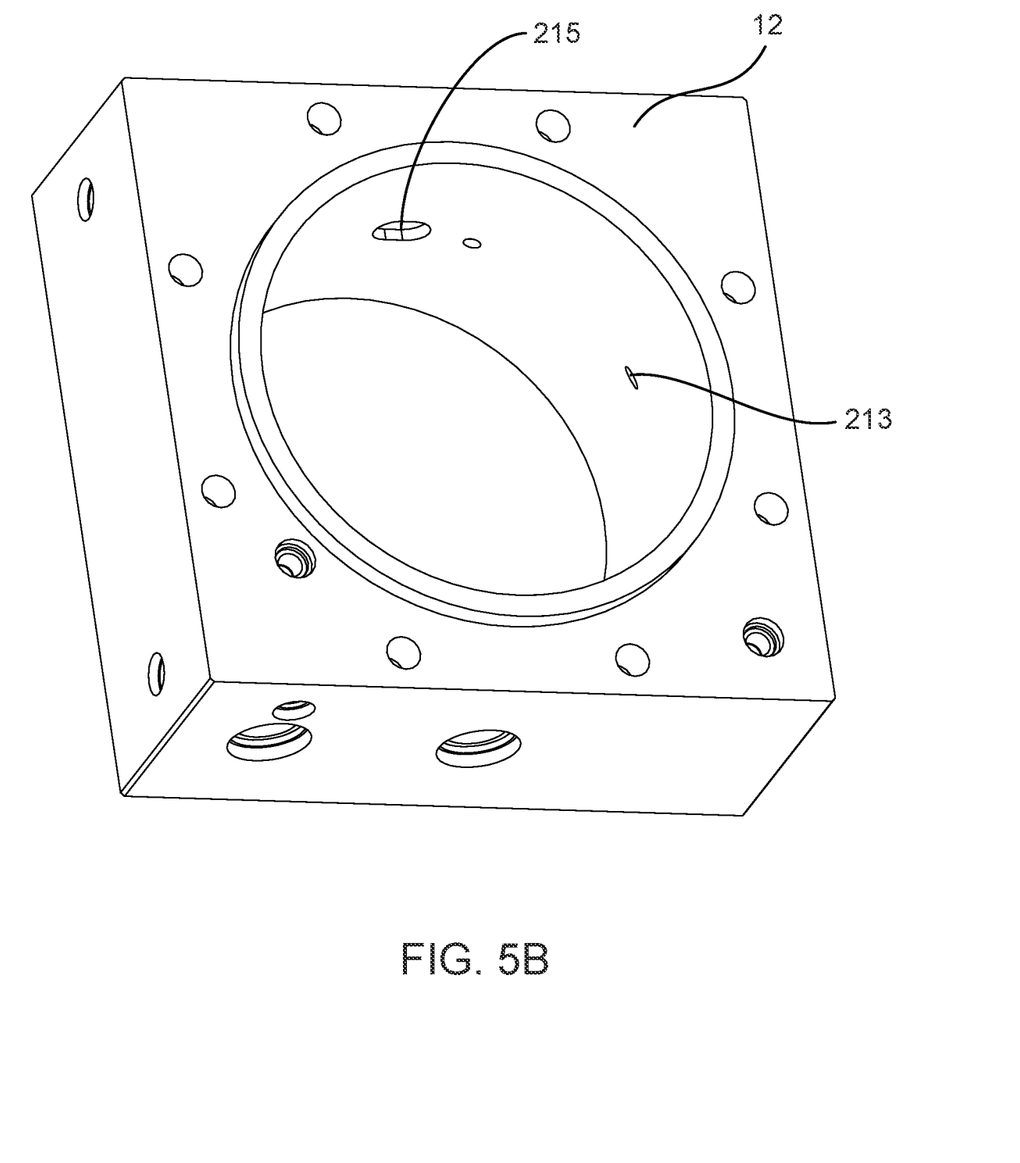
FIG. 5B is another perspective view of a manifold member with dual inlets and dual outlets according to an embodiment.

Referring further to the drawings, FIGS. 5A-5B depict another embodiment of a manifold member 12. The manifold member 12 depicted in FIGS. 5A-5B include a first inlet orifice 113 and a second inlet orifice 213 located 180 degrees from each other. Each of these inlets are aligned in a similar manner as the alignment of the inlet orifice 13 with the tapered surface 39 of each groove 38. This allows for hydraulic fluid to engage the channel groove drive 36 on opposing sides of the power generating device 30. Additionally, the manifold member 12 may include a first outlet orifice 115 and a second outlet orifice 215 located 180 degrees from each other. Each operates to allow hydraulic fluid to exit the inner volume 14 of the manifold member. In some embodiments the inlet orifices 113, 213 are located 90 degrees from the outlet orifices 115, 215.

The motor 10 may be coupled to external devices to supply power to from the power generating member 30, such as gears and so forth. The motor 10 may also be scaled to various sizes as needed for the various desired power and implementation of the hydraulic motor 10.

Further still, embodiments may include a method of operating a hydraulic motor 10. The method may include directing flow of hydraulic oil into a manifold member with a power generating member coupled within the manifold member, wherein the power generating member comprises a spool comprising a channeled grooved drive having a plurality of recessed grooves; rotating the power generating member rotates in response to a portion of the hydraulic oil directed into the inner volume of the manifold member engaging one or more recessed grooves of the plurality of recessed grooves; and directing flow of hydraulic oil out of the manifold member.

The method may further comprise prior to rotating the power generating member, directing flow of hydraulic fluid through the channel until the hydraulic oil reaches operating temperature.

The method may further comprise determining torque and speed of rotation of the power generating device in response to selecting a location of the inlet orifice with respect to the fluid engaging surface, a depth and width of each recessed groove, a size of the inlet orifice, a diameter of the power generating device or combinations thereof.

The method may further comprise supplying power to an external device operatively coupled to the power generating member.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:
1. A hydraulic motor comprising:
a manifold member comprising an inner volume, a fluid inlet orifice and a fluid outlet orifice; and
a power generating member operatively coupled within the manifold member, power generating member comprising a channeled grooved drive, wherein:
the power generating member further comprises a spool and a drive shaft, wherein the drive shaft extends out of the manifold member; and
the channeled grooved drive comprises:
a channel formed in the outer surface of the spool of the power generating member, the channel forming a bottom surface having a constant width and a lip on either side of the bottom surface extending transverse from the bottom surface of the channel in a direction away from an axis of the spool;
a plurality of recessed grooves formed in the bottom surface of the channel, wherein the plurality of recessed grooves are evenly spaced around the circumference of the spool and each recessed groove comprises a fluid engaging surface, wherein the power generating member rotates in response to hydraulic oil flowing into the inner volume of the manifold member through the inlet orifice, wherein the hydraulic oil engages the plurality of recessed grooves to rotate the power generating member, and the hydraulic oil flows out of the inner volume of the manifold member through the outlet orifice.
2. The device of claim 1, wherein each recessed groove further comprises a slot, a notch or comprises a tapered surface extending from an edge of the fluid engaging surface within the spool and the outer surface of the spool.

3. The device of claim 1, wherein the power generating member is configured to couple the drive shaft to and supply power to an external device.

4. A method of operating a hydraulic motor comprising:
directing flow of hydraulic oil into a manifold member with a power generating member coupled within the manifold member, wherein the power generating member comprises a drive shaft extending out of the manifold member and a channeled groove drive comprising:
a channel formed in the outer surface of the spool of the power generating member, the channel forming a bottom surface having a constant width and a lip on either side of the bottom surface extending transverse from the bottom surface of the channel in a direction away from an axis of the spool; and
a plurality of recessed grooves formed in the bottom surface of the channel, wherein the plurality of recessed grooves are evenly spaced around the circumference of the spool;
rotating the power generating member rotates in response to the hydraulic oil directed into the inner volume of the manifold member engaging one or more recessed grooves of the plurality of recessed grooves, and generating power in response to rotating the power generating member; and
directing flow of hydraulic oil out of the manifold member.

5. The method of claim 4, further comprising determining torque and speed of rotation of the power generating device in response to selecting a location of an inlet orifice with respect to a fluid engaging surface of each of the plurality of recessed grooves, a depth and width of each recessed groove, a depth and width of the channel, a size of the inlet orifice, a diameter of the power generating device or combinations thereof.

6. The method of claim 4, further comprising supplying power to an external device operatively coupled to the power generating member.

* * * * *